(12) United States Patent
Ehrick et al.

(10) Patent No.: US 6,726,091 B1
(45) Date of Patent: Apr. 27, 2004

(54) DEIONIZED WATER WASHING SYSTEM AND CONTROLS

(75) Inventors: Stephen D. Ehrick, Yorba Linda, CA (US); David A. Ehrick, Yorba Linda, CA (US)

(73) Assignee: Ionman Wash Systems, LLC, Yorba Linda, CA (US)

( * ) Notice: Subject to any disclaimer, the term of this patent is extended or adjusted under 35 U.S.C. 154(b) by 0 days.

(21) Appl. No.: 09/415,076

(22) Filed: Oct. 12, 1999

(51) Int. Cl.[7] .............................................. G06F 17/00
(52) U.S. Cl. ...................................... 235/375; 235/384
(58) Field of Search ................................ 235/375, 380, 235/384

(56) References Cited

U.S. PATENT DOCUMENTS

| | | | | |
|---|---|---|---|---|
| 3,660,858 A | * | 5/1972 | Smith, Jr. ......................... 15/1 |
| 3,712,335 A | * | 1/1973 | Wiebe ......................... 137/599 |
| 3,786,421 A | | 1/1974 | Wostl |
| 4,395,626 A | | 7/1983 | Barker |
| 4,413,785 A | * | 11/1983 | Engelbert et al. ............ 239/443 |
| 4,512,814 A | * | 4/1985 | Buck ............................. 134/34 |
| 5,135,656 A | * | 8/1992 | Means et al. ................ 210/650 |
| 6,042,730 A | * | 3/2000 | Lahti ........................... 210/667 |
| 6,308,885 B1 | * | 10/2001 | Douglass .................... 232/57.5 |

* cited by examiner

Primary Examiner—Karl Frech
(74) Attorney, Agent, or Firm—William W. Haefliger

(57) ABSTRACT

A system to produce a high pressure stream of deionized water, for cleaning vehicle bodies, comprising, in combination, first and second deionization beds within first and second vessels, a first conduit or conduits to conduct non-deionized water at a relatively low pressure or pressures to pass through the first bed to deionize the water, a primary sensor to measure the deionization level of water that has passed through the first bed, a second conduit or conduits to conduct water from the first bed to the second bed to further deionize the water, if required, a pump to receive water that has passed through the first bed, or through the first and second beds, and to pressurized said received water to a level of at least about 1,200 PSI, and a nozzle connected to the pump to dispense a high pressure stream of the water.

30 Claims, 17 Drawing Sheets

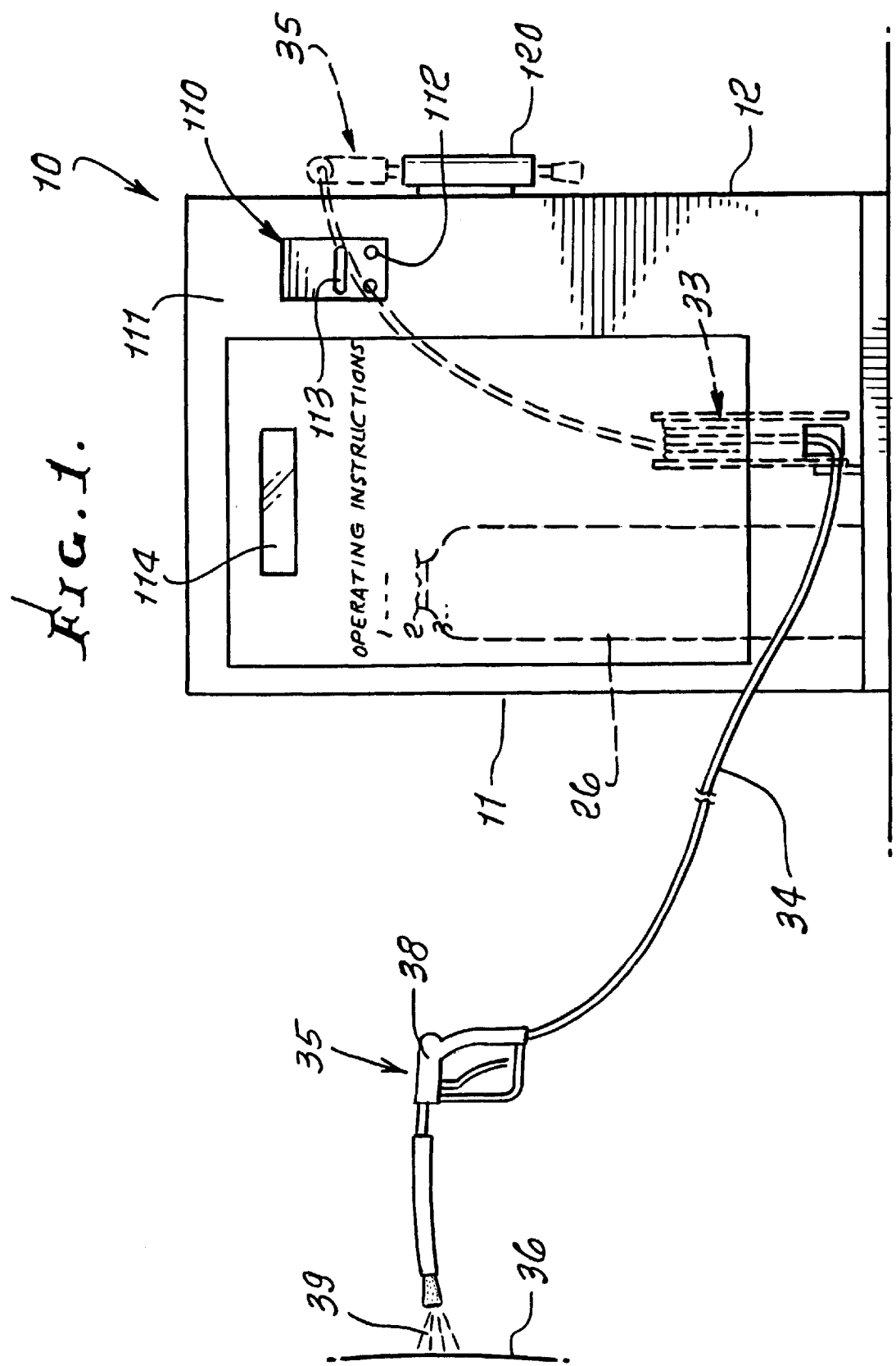

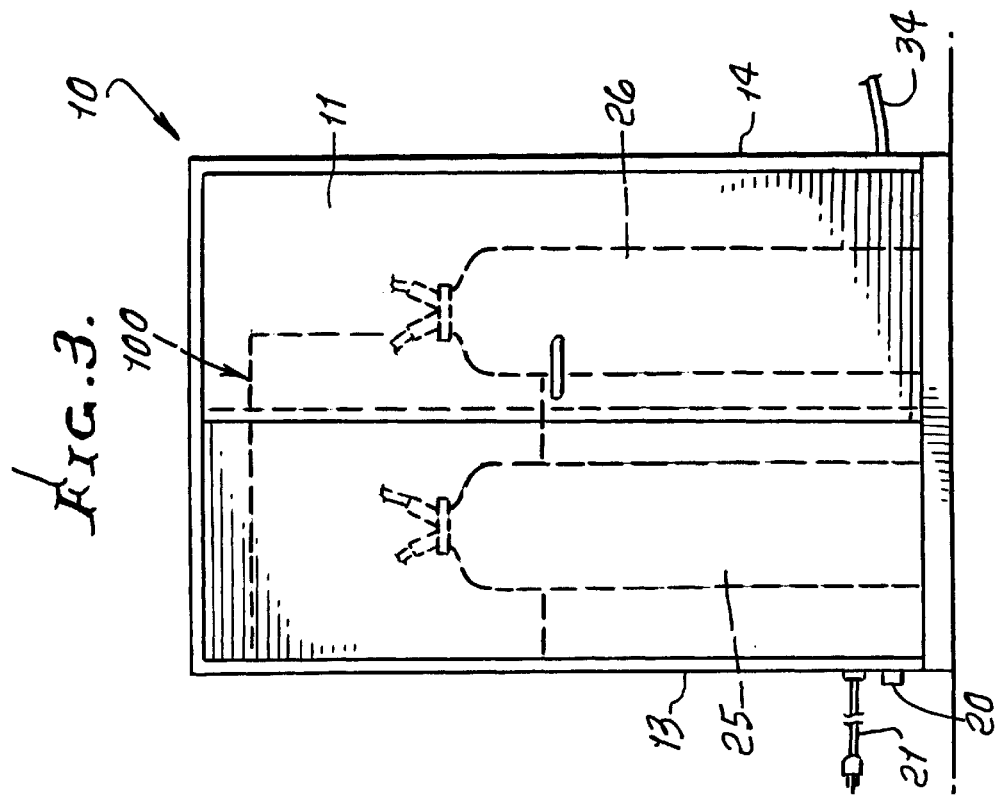
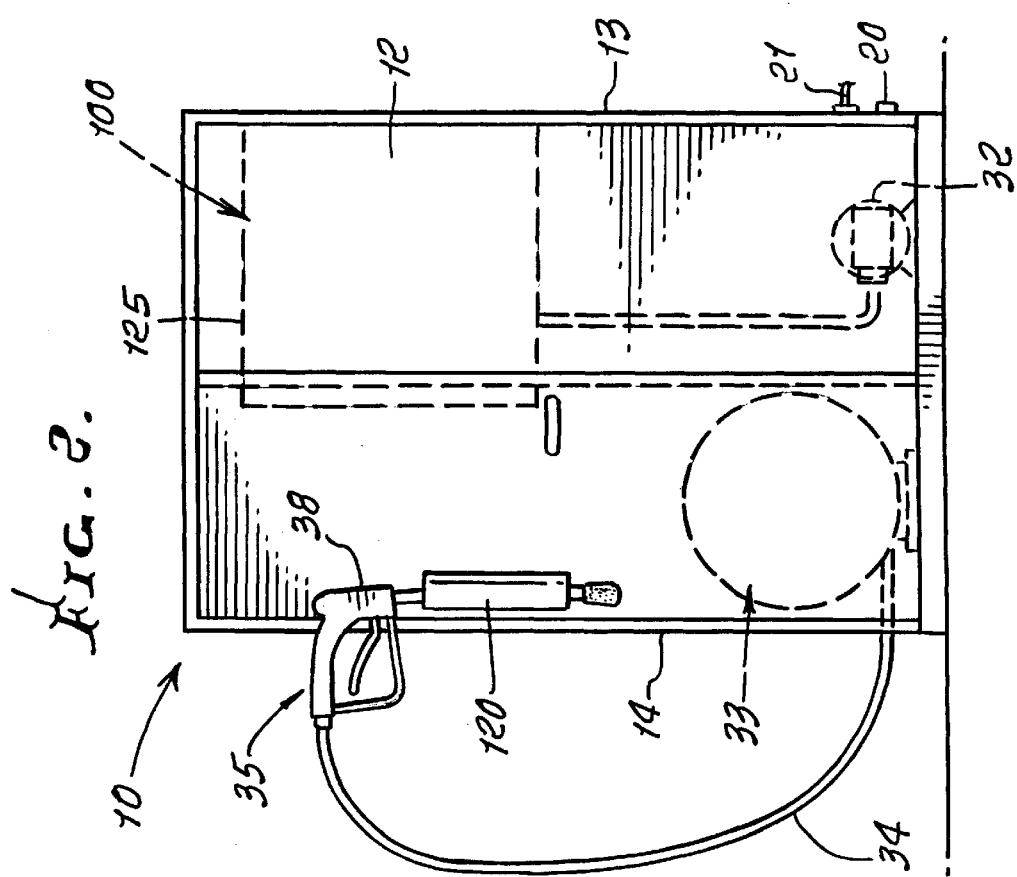

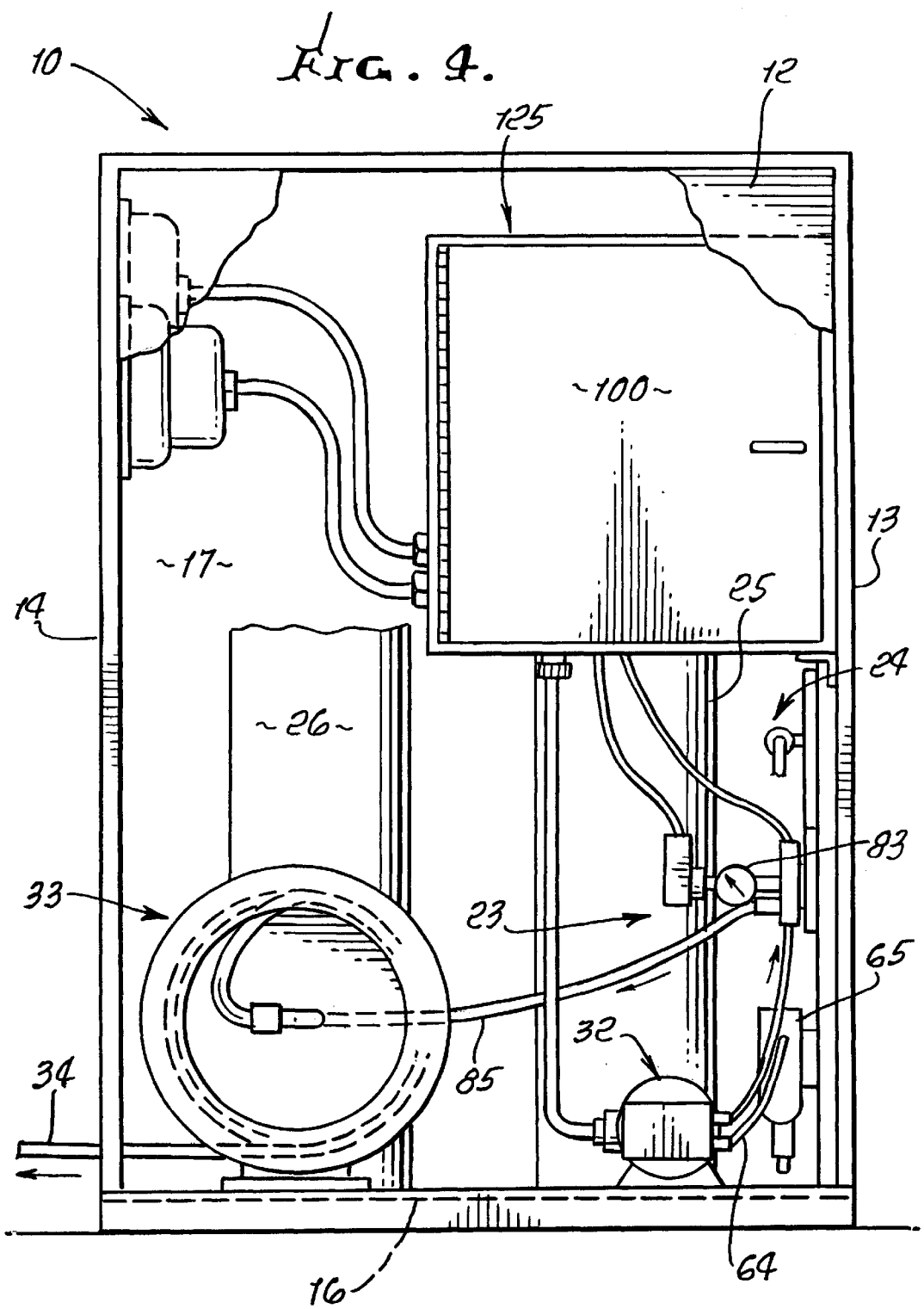

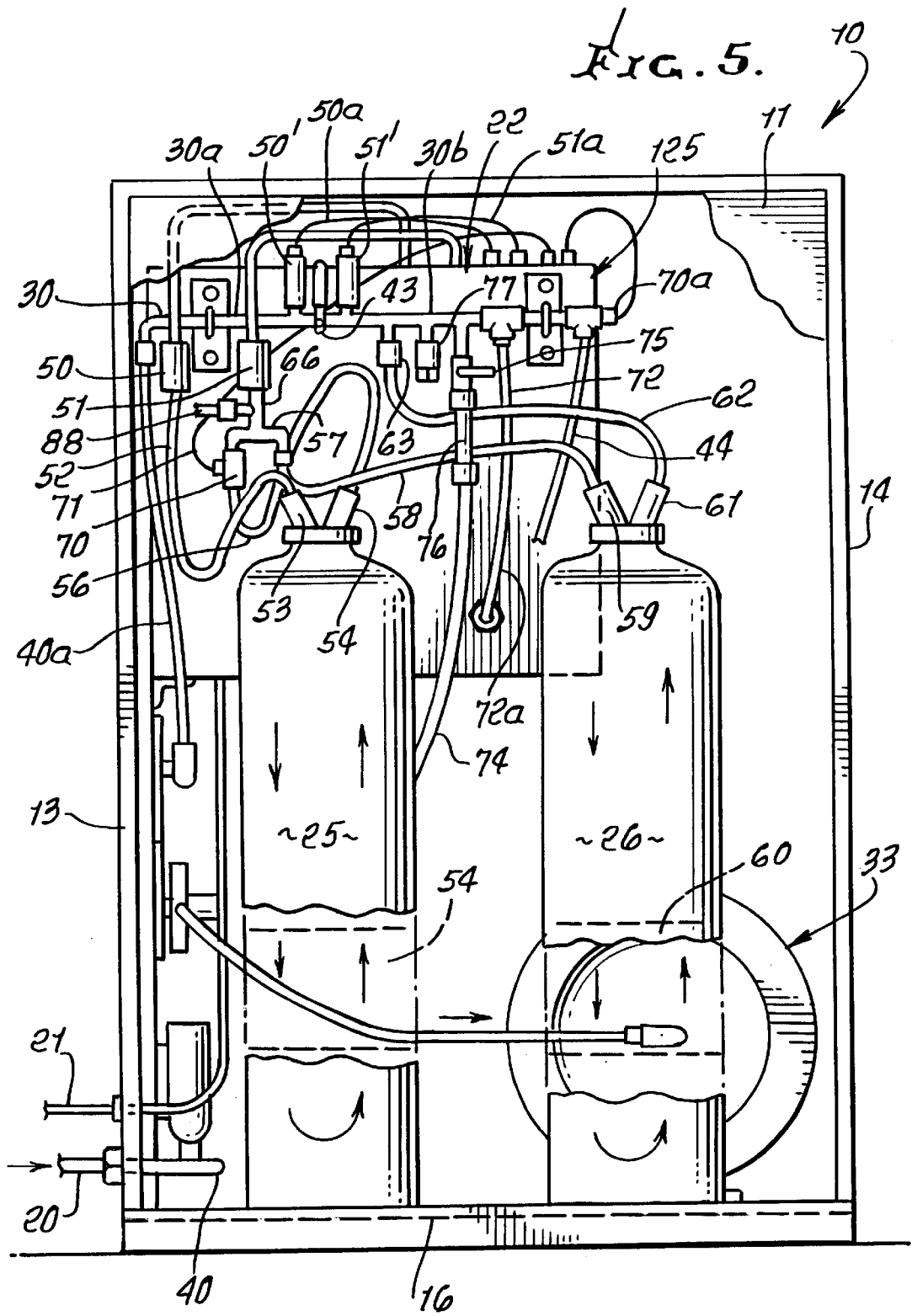

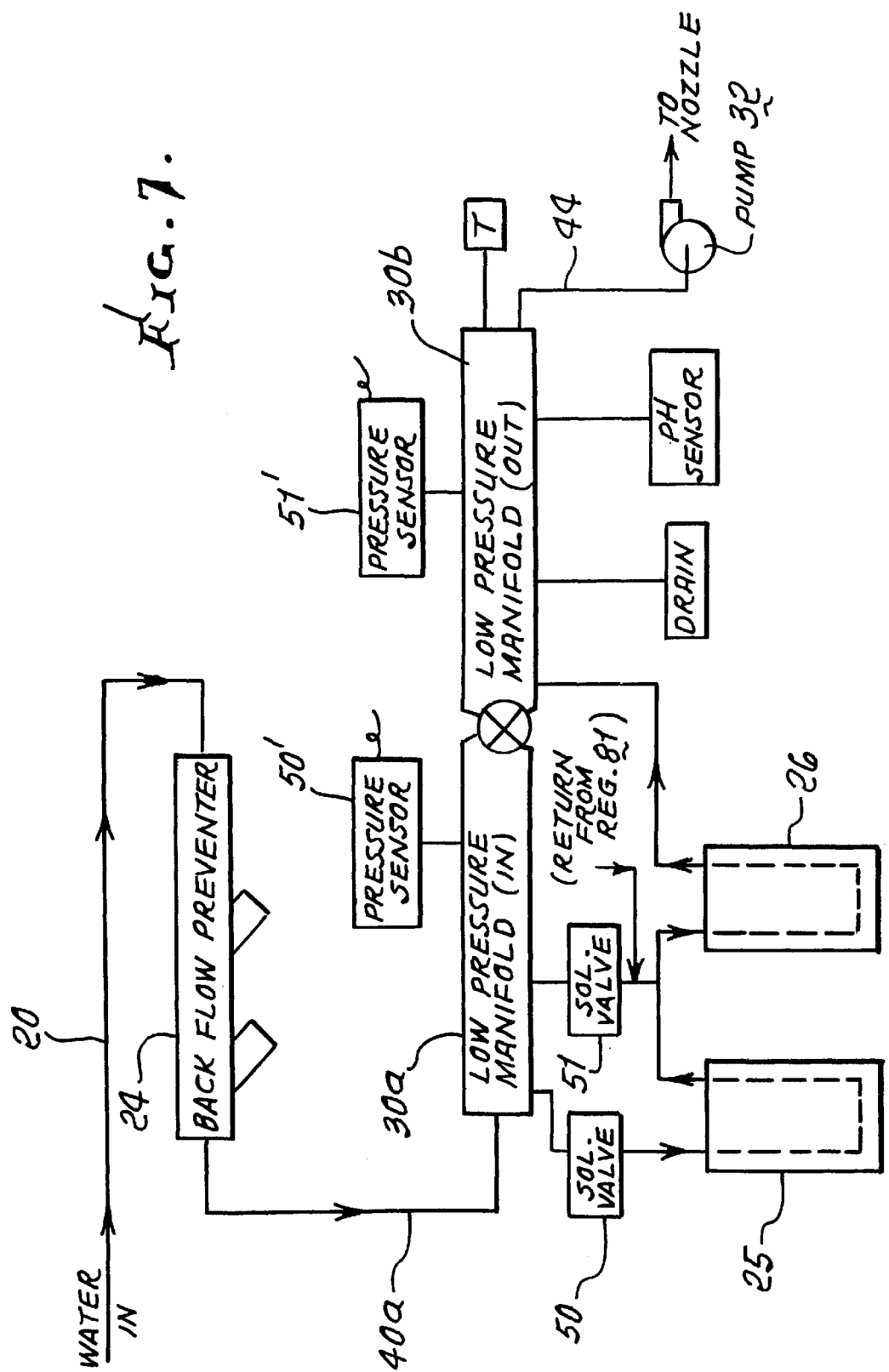

HIGH PRESSURE MODE
HIGH FLOW TO BY-PASS
WAND (NOZZLE) VALVE CLOSED

WAND (NOZZLE) VALVE OPEN

COMPUTER INTERPRETS INPUTS FROM SENSORS 84 AND 84a AS A FAILURE MODE WAND(NOZZLE) MISSING, AND SHUTS DOWN SYSTEM AND CALLS HOME

NO FLOW (FAILED REGULATOR 81)
COMPUTER INTERPRETS INPUTS
FROM 84 AND 84a AS A
FAILURE MODE, AND
SHUTS DOWN SYSTEM

UNIT OPERATION

UNIT START-UP

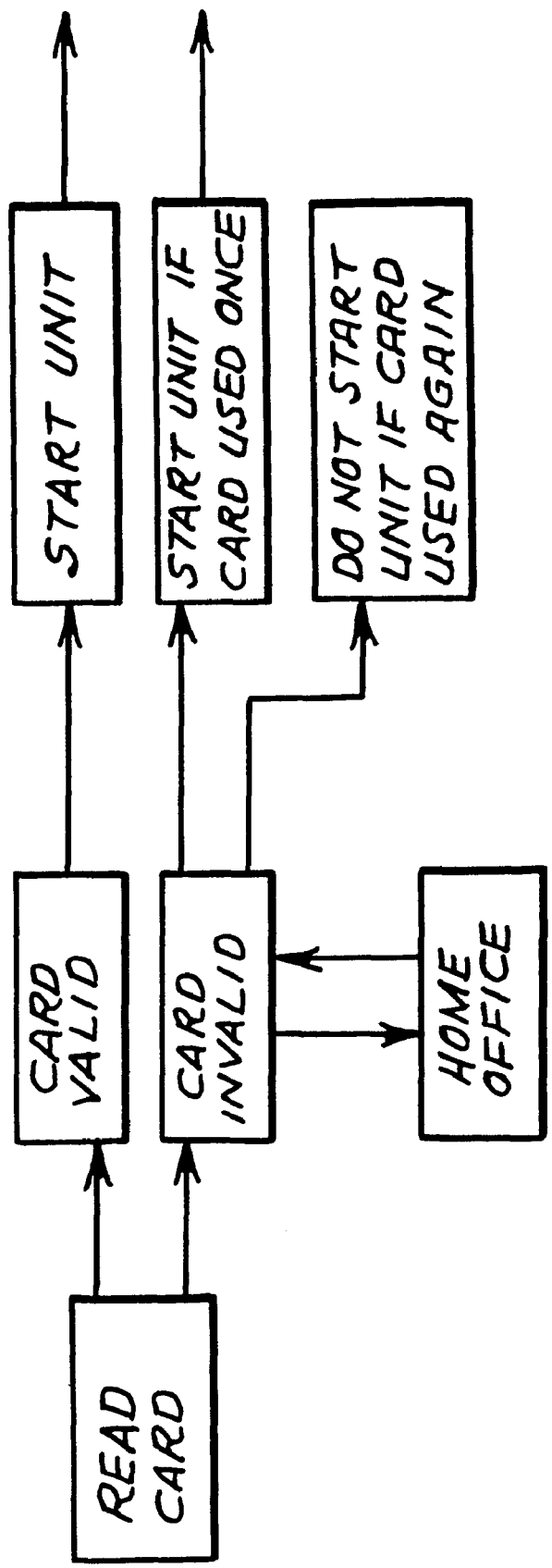
Fig. 10a. CARD CHECK

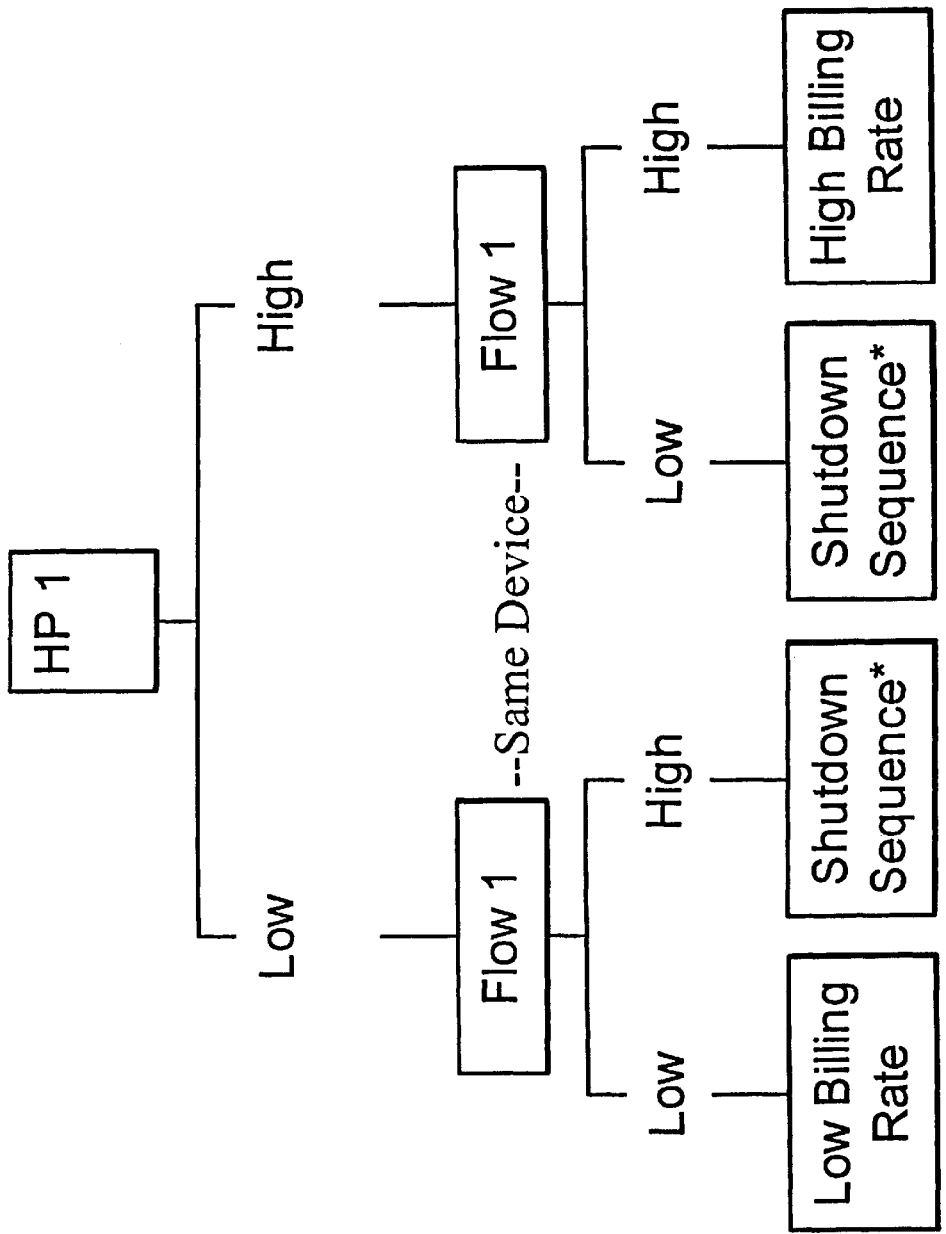

DEIONIZING BED SELECTION

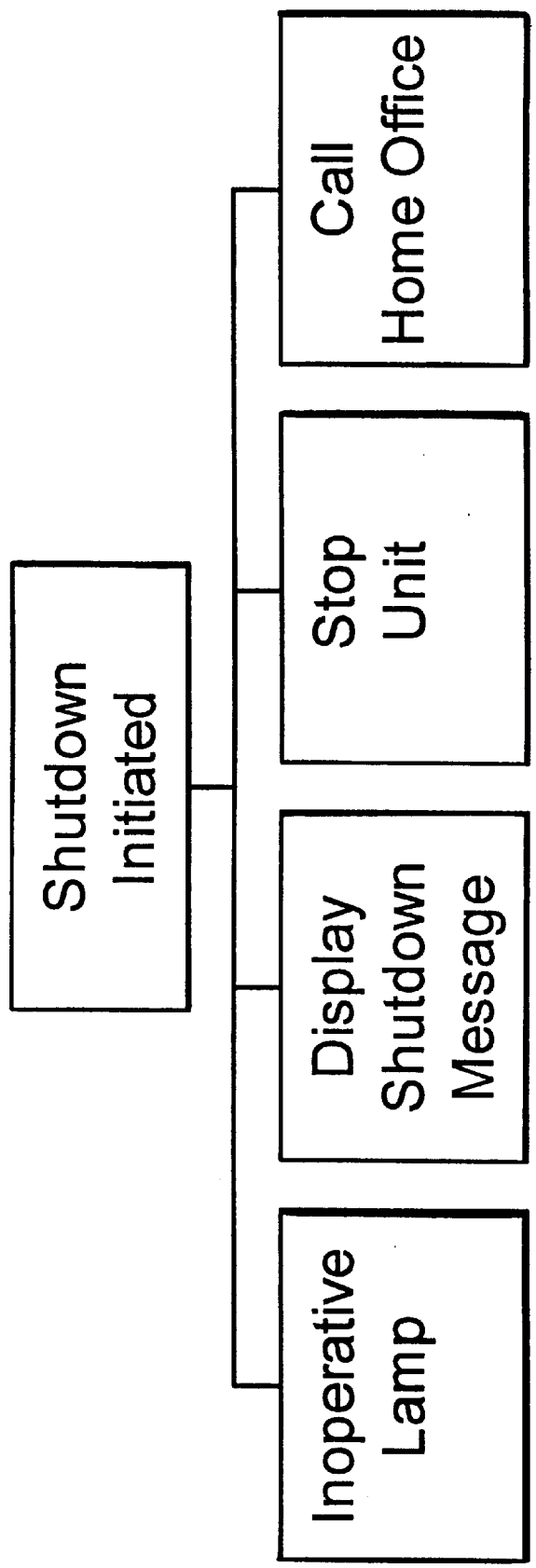

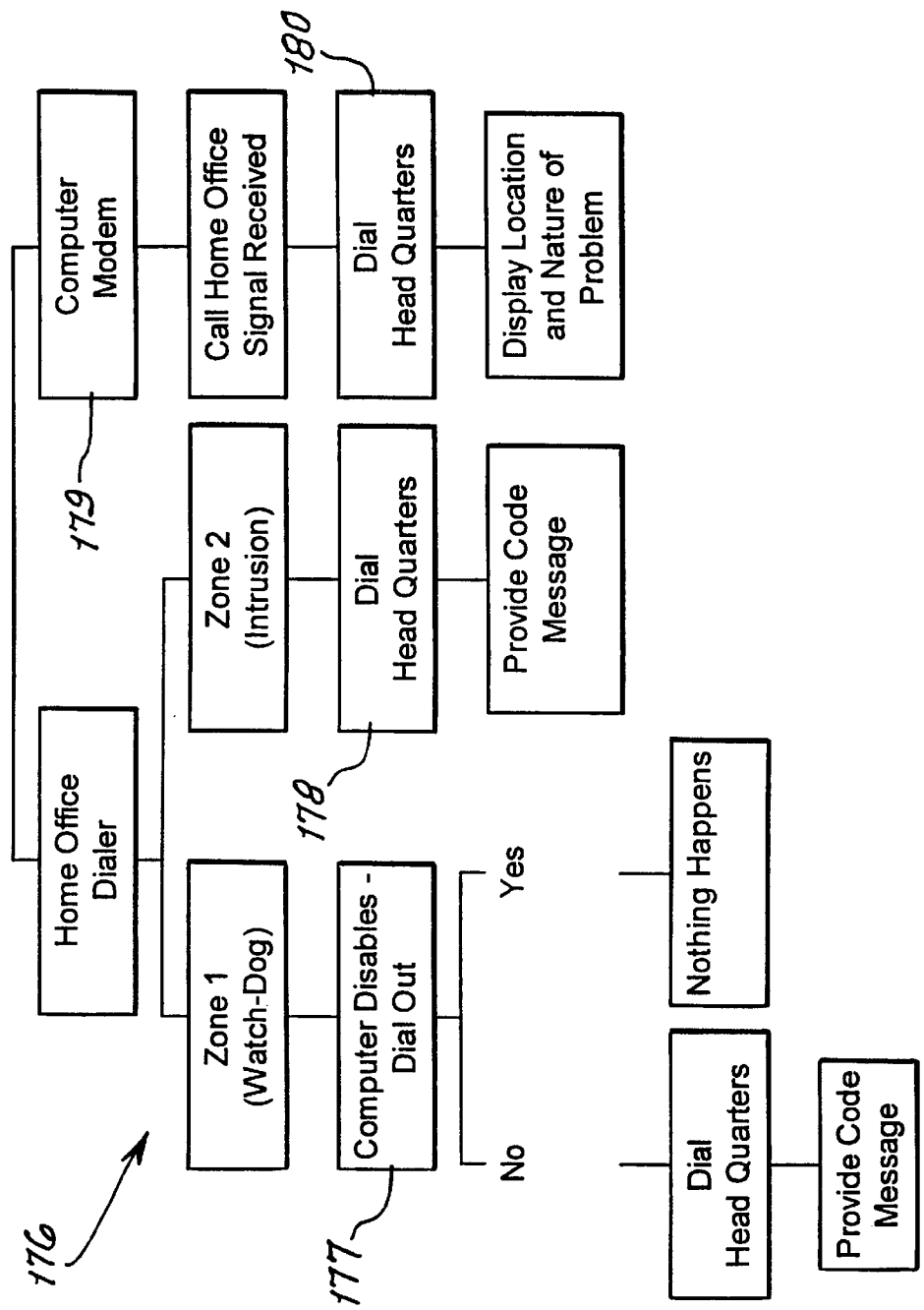

DEIONIZED WATER WASHING SYSTEM AND CONTROLS

BACKGROUND OF THE INVENTION

This invention relates generally to wash systems, such as systems relating to vehicle washing; more particularly it concerns method and apparatus for such washing, employing deionized water.

As is known, very large numbers of vehicles such as trucks, automobiles, and boats are hand washed frequently, employing tap water at city pressure below 100 psi, and/or soaps, and/or detergents. This results in required use of millions of gallons of tap water, and tons of soaps and detergents, frequently entering storm sewer systems and water bodies receiving flow from such sewer systems.

Although efforts to reduce industrial pollution have been successful, the lack of a low cost convenient alternative to hand washing of vehicles has prevented or has limited success in this area. In fact, the lack of an acceptable alternative has been responsible for issuance of exemptions for residential vehicle washing.

SUMMARY OF THE INVENTION

It is a major object of the invention to provide cleaning apparatus and methods, employing a high-pressure stream or streams of de-ionized water, used in ways providing a solution or solutions to the above described problems. The use of a stream or streams of high-pressure de-ionized water, directed at vehicle surfaces, accomplishes superior cleaning, eliminates need for soap and/or detergent, enables spot-free air drying of such surfaces, and provides a time-saving incentive for the user. In this regard, water at city pressure of 65 PSI and flow rate of 6 GPM represents 390 cleaning units. A low flow high-pressure system like the present system typically may have a cleaning unit rating of 2520, or about 6 times the cleaning potential. This also helps to eliminate the need for soap and contributes to the water usage savings associated with the present system.

Basically, the improved system to produce a high pressure stream of deionized water, for cleaning vehicle metal bodies, comprises, in combination:

a) first and second deionization beds within first and second vessels, b) a first conduit or conduits to conduct non-deionized water at a relatively low pressure or pressures to pass through the first bed to deionize the water, c) a primary sensor to measure the deionization level of water that has passed through the first bed, d) a second conduit or conduits to conduct water from the first bed to the second bed to further deionize the water, if required, e) a pump to receive water that has passed through the first bed, or through the first and second beds, and to pressurize said received water to a level above about 1,200 PSI, f) and a nozzle connected to the pump and operable to controllably dispense a high pressure stream of the water, for vehicle cleaning.

In one example, when operated with a credit card or token, the unit operates by passing water through two deionizing beds and then to a high-pressure pump. Water is dispensed through a hose and hand-held wand. Typically, automobile complete cleaning time is about 50 to 100 seconds, with a water usage of about 2 to 3 gallons, total.

A further object is to provide a by-pass conduit to return water from the pump to one of the vessels when flow of water from the nozzle is interrupted, whereby the apparatus then operates at an idle level.

A yet further object is to provide valving controlled by the primary sensor to alter flow of water via the second conduit or conduits to the second bed, in response to detection by the primary sensor of an ionization level that is insufficiently low.

An additional object is to provide a data card reader, and control means responsive to operation of that reader to control flow of water in the system. In this regard, a chamber is typically provided in which the dionization vessels, conduits and pump are located, the nozzle located outside that chamber, the reader carried by the chamber to read information on a data card presented at a reading zone accessible at the exterior of the chamber.

Another important object is to provide control means includes circuitry responsive to reading of both valid and invalid data cards to effect flow of water to the beds. Such data cards typically comprise plastic credit cards.

A yet further object is to provide a means responsive to determination of a non-neutral pH level or unacceptable mineral content of water that has passed through at least one of the beds to effect all of the following:

i) shut down of water flow through the beds and pump
ii) energizing of a message display
iii) energizing of a display lamp
iv) message transmission to a control center.

An additional object is to provide a low pressure manifold structure including first and second manifold sections, valving blocking communication between the sections, the first section communicating with an inlet or inlets to at least one of the vessels, and the second section communicating with an outlet or outlets from at least one of said vessels, whereby water flows from the manifold first section to the manifold second section via a bed or beds in at least one of the vessels.

A further object is to provide an assembly operatively connected between the pump and nozzle and including i) a regulator valve
ii) a first sensor comprising a flow pressure sensor at the downstream side of the regulator valve,
iii) and a second sensor comprising a flow sensor at the downstream side of the regulator valve,
iv) a by-pass conduit or conduits is connected between the regulator valve and the intake side of one of said deionization bed vessels, and
v) control means responsive to operation of the sensors, whereby in the event of no-flow as sensed by the second sensor, and of high pressure as sensed by the first sensor, the control means operates to open the regulator valve to by-pass the flow to the intake side of the deionization vessel or vessels, and whereby in the event of high flow as sensed by said second sensor and very low pressure as sensed by said first sensor, the control means operates to shut down the system; and whereby, in the event of predetermined acceptable flow as sensed by the second sensor, and predetermined acceptable high flow pressure, the control means will allow the regulator valve to continue to pass the flow from the pump to the nozzle.

Additional objects concern provision of system control circuitry or software and methods of control for controlling operation (including business methods) of the apparatus in different modes, as will be seen, and basically including.

a) a wash station including water flow deionizing and delivery elements, and having at least two deionizing treatment beds, b) computer apparatus associated with said station, and including circuitry, c) said circuitry having first means for sensing an operating input by a user at said station, and to produce an output, d) the circuitry also having
   i) second means responsive to said output to initiate operation with flow to said deionizing and delivery elements,
   ii) third means responsive to composition of said flow to control water flow through one or more of said beds, e) and there being fourth means responsive to pressure of said flow to effect a change in said flow when said flow pressure changes relative to a predetermined limit or limits.

These and other objects and advantages of the invention, as well as the details of an illustrative embodiment, will be more fully understood from the following specification and drawings, in which:

DRAWING DESCRIPTION

FIG. 1 is an elevation showing a washing station, and equipment, as during washing;

FIG. 2 is a view like FIG. 1, but showing the station with a washing nozzle in stored position;

FIG. 3 is an elevation showing the rear side of the station seen in FIG. 2;

FIG. 4 is a view like FIG. 3, but enlarged having the rear side of the container broken away, to illustrate interior details;

FIG. 5 is a view like FIG. 2, enlarged and having the front wall and doors broken away to illustrate interior details;

FIG. 7 is a block diagram showing system components in schematic form;

Figure 6:
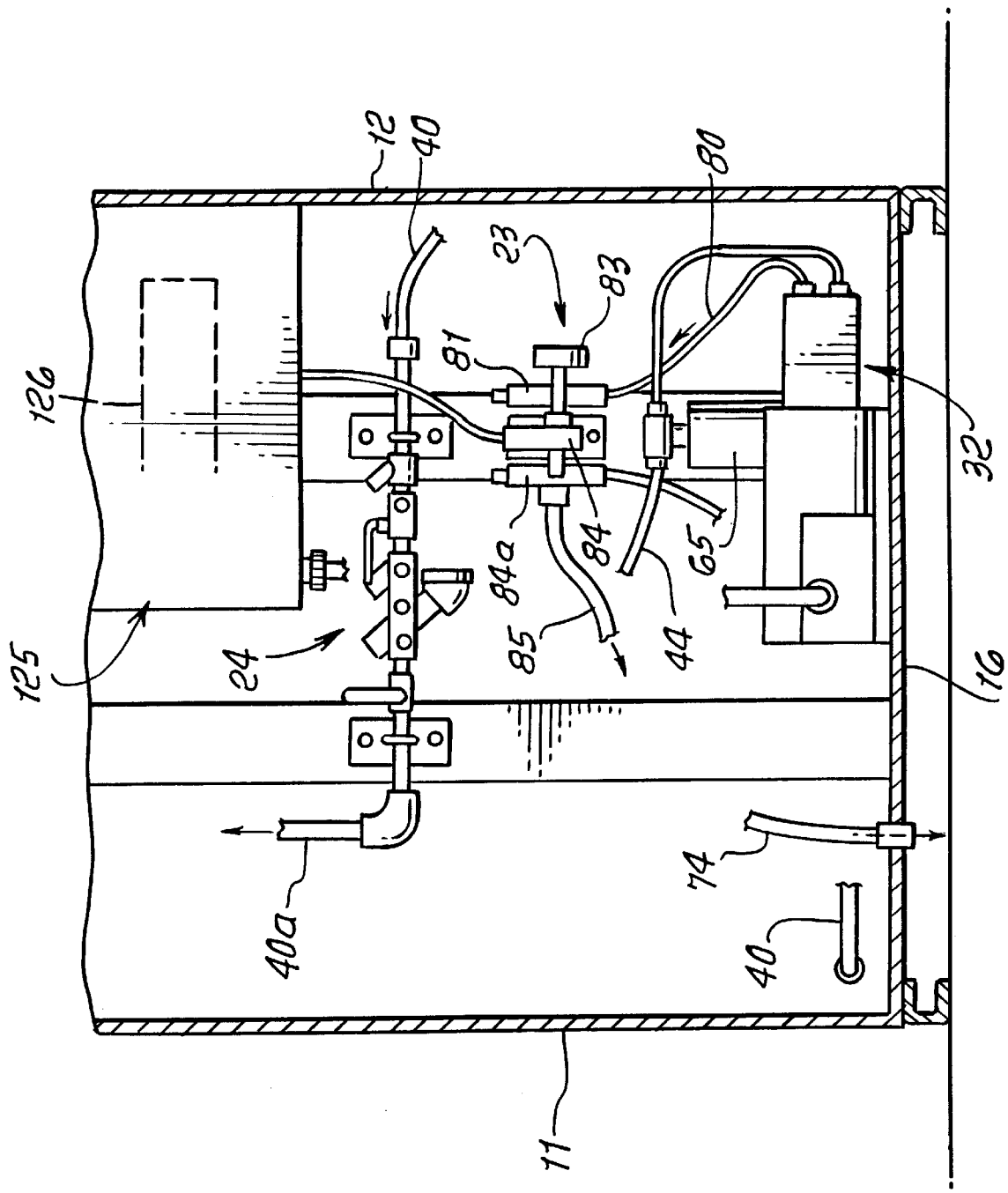
FIG. 6 is an enlarged view of the cabinet lower interior, to show interior details.
Figure 8A:
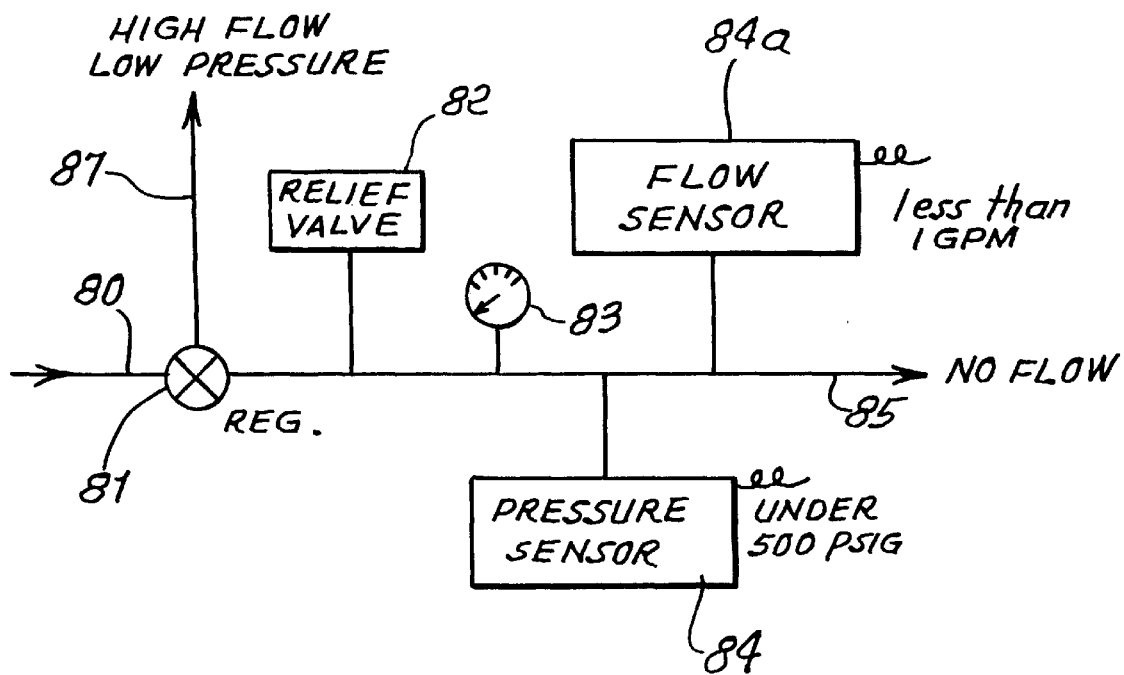
Figure 8B:
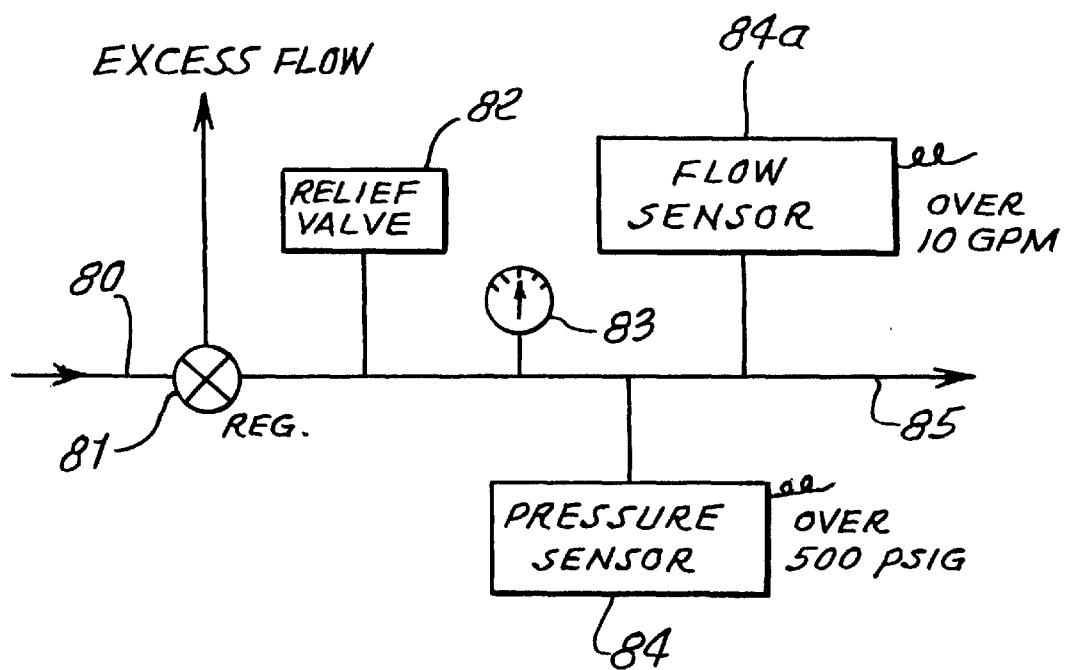
Figure 8C:
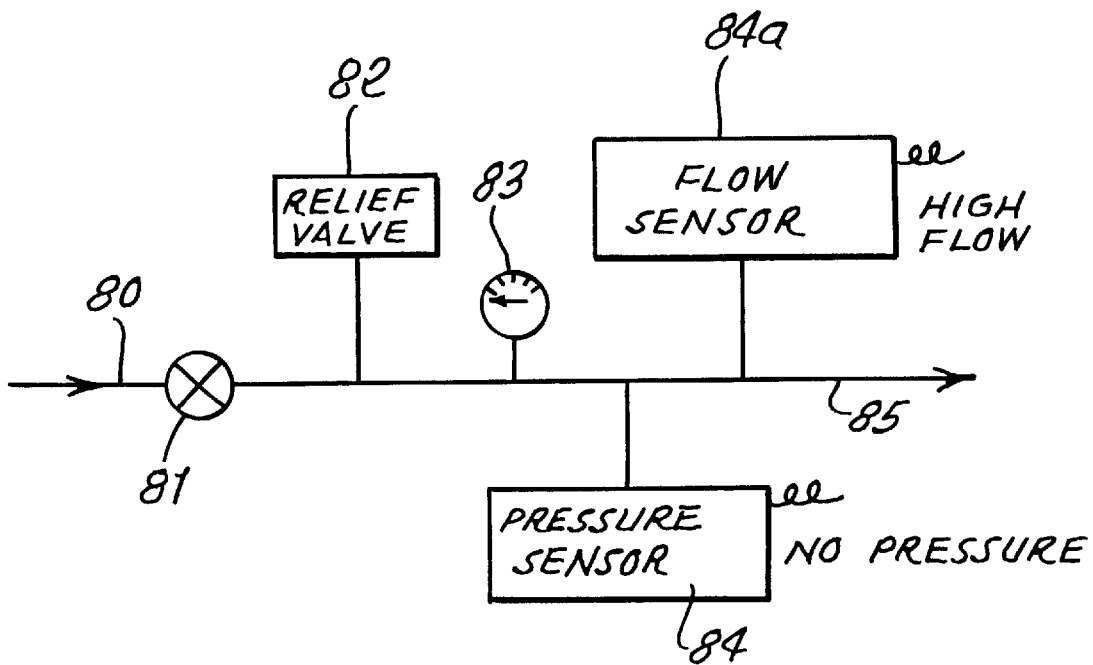
Figure 8D:
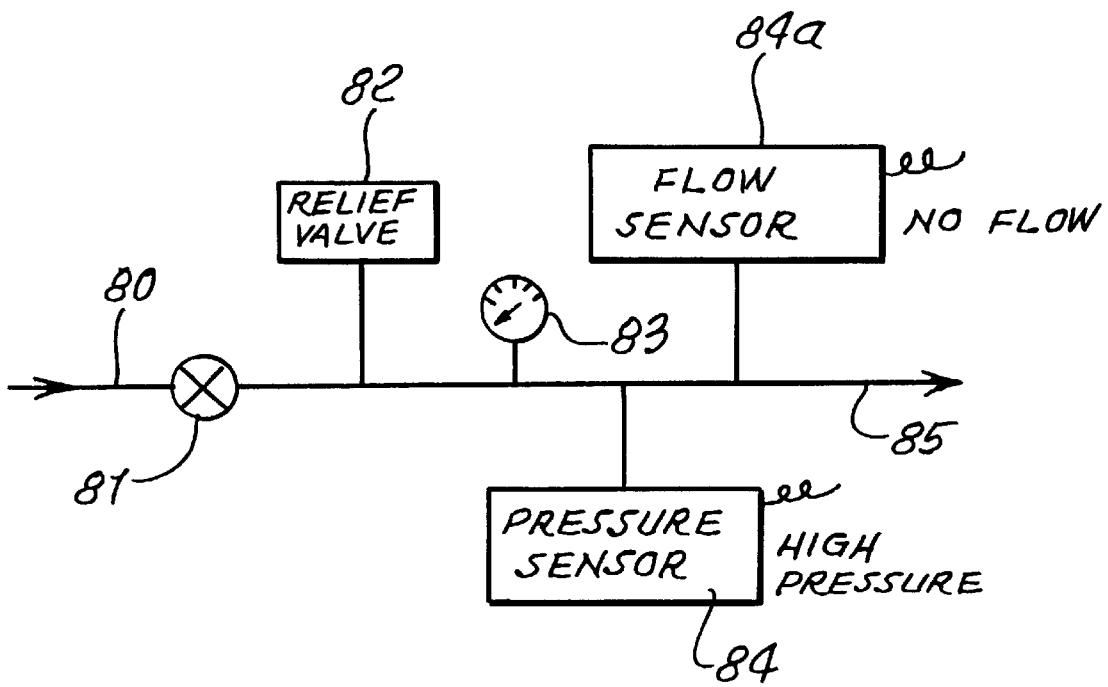

FIGS. 8(a)–8(d) are block diagrams showing status, of system components during is different flow, no-flow and high and low pressure conditions;

FIGS. 9–14 are block diagrams labeled for showing operation sequencing and functioning, as controlled by associated software means or elements.

DETAILED DESCRIPTION

In the drawings, a container 10 has side walls 11 and 12, end walls 13 and 14, a top 15, and a perforated bottom panel 16 to enable inflow of cooling air, and drainage of water from the container interior 17. Referring to FIG. 5, there are two inlets to the container wall 13, inlet 20 for supply water as from city mains, at pressure for example between 60 psi and 70 psi, and electrical inlet 21 for a cable or cables.

Located within the container are a low water pressure manifold assembly 22, as seen in FIG. 5, a high water pressure manifold assembly 23, as seen in FIGS. 4 and 6, a back-flow prevention assembly 24 as seen in FIG. 6, and two vertically elongated deionization tanks 25 and 26 as best seen in FIG. 5. The latter figure also shows piping connections between the low water pressure manifold ducting 30 which is shown as extending horizontally above the levels of the two tanks 25 and 26, and the two tanks 25 and 26. Also located within the container as seen in FIG. 4 are high-pressure pump 32, and a hose reel 33, from which hose 34 extends at the tank exterior to a nozzle unit 35. That unit contains a valve 38 for delivering water as a high-pressure spray 39 for cleaning the surface of a vehicle by high-pressure spray impact see FIG. 1, showing a vehicle at 36.

LOW PRESSURE MANIFOLD AND PIPING

Turning to FIGS. 5 and 6, entering water is first delivered upwardly in pipe 40 to the back-flow prevention assembly 24, and then upwardly in pipe 40a to the left end 41a of manifold duct 30, for rightward flow in the "in" or left section 30a of the manifold, located to the left of a valve 43. That valve closes off communication between the left section 30a of the manifold and the "out" or right section 30b of the manifold duct. See also the FIG. 7 diagram, showing the manifold duct section 30b delivering water via line 44 at low pressure to the pump 32.

Connected in parallel branch relation to the manifold "in" section 30a are two solenoid controlled valves 50 and 51. When valve 50 is open, water flows via line 52 to top inlet 53 of first deionizor tank 25, then downward in that tank and back upward, through deionizing beds 54, and then to the tank outlet 55. From outlet 55, deionized water flows via piping 56, 57 and 58 to the top inlet 59 of second deionizer tank 26. Water flows downwardly in that tank and back upwardly, through deionizer beds 60, and then to the outlet 61 of the tank 26. From outlet 61, water flows in duct or pipe 62 to an inlet 63 to the manifold duct "out" section 30b. From that section, water flows (at inlet pressure less any pressure drops) to the inlet 65 of pump 32, via line 64 from filter 65, as seen in FIGS. 4 and 5.

Referring to FIG. 5, it will be understood that the second solenoid valve 51 can be opened to deliver inlet water via line 66 to piping 57 and then via pipe 58 to tank 26. In this regard, a solenoid valve 50 in pipe 52 can be closed, isolating tank 25 from pipe 57, and tank 25 can then be removed, and a replacement "new" tank with a fresh deionizer bed can be substituted; or, the system can be shut down, and tank 26 put in the position of first tank 25, and the "new" tank installed in the second tank position. The tank in the position of tank 25 normally removes 100% of the ionic material to be removed from the water flow, so the tank 26 functions mainly as a back-up in case the bed or beds in tank 25 are filled with removed solid material (for example, calcium, magnesium, aluminum, and their salts such as carbonates, sulfates, etc.). Ultra pure water (0–10 parts per million dissolved solids) is thereby delivered to the nozzle assembly, enabling provision of a soapless, high effective, high pressure wash system, for vehicles. High pressure (1,000–1,200 psi) at the nozzle provides a high velocity spray, for superior cleaning effect.

Various sensors are positioned along the water flow path to detect parameters. For example, referring to FIGS. 1 and 7, pressure sensing switch 50' is connected into manifold section 30a and another pressure sensing switch 51' is connected into manifold section 30b. If the water pressure in either section is below a predetermined level, the switch connected to that section will signal the master control, such as computer 100, as via lines 50a and 51a and the computer will shut down the system, including shutting off inlet valves 50 and 51. A total dissolves solids (TDS) detector 70 installed in line 56 operates to detect the total dissolve solids in the flow from tank 25, and if that level is too high, it will signal the computer 100 via line 71, and the computer is programmed to by-pass tank 25. A second TDS sensor 70a is shown as installed at manifold section 30b. A pH detector 72 is connected to manifold section 30b. pH level and total dissolved solids in the deionized flow to the pump are thereby detected. The computer circuitry will shut-down the system if these levels are abnormal. Note line 72a to the computer. A line 74 to drain is connected to manifold section 301, in series with a manually operated valve 75, and a sight glass 76. At start-up, valve 75 is opened by hand, and flow in section 30b is tapped via 75 and 74, and bi-pass flow visually monitored via glass 76 for pressence of air bubbles. When bubbles in the flow cease, valve 75 is closed. Pressure relief valve 77 is connected to manifold 306 to relieve pressure exceeding approximately 150 psig. This condition may occur for example if the unit is heated by the sun during non-operation, causing water in the manifold and tanks to expand.

Barrier valve 43 between 30a and 30b can be opened, if desired, and valves 50 and 51, closed, enabling flow of untreated supply water to the pump and spray nozzle unit 35, as during system maintenance and calibration.

HIGH PRESSURE MANIFOLD ASSEMBLY AND PIPING

Referring now to FIGS. 4, 6, 8(a), 8(b), 8(c) and 8(d), the high pressure manifold assembly 23 and its operation will now be described. It receives high pressure inflow of deionized water from the pump 32, via line 80. The assembly includes a flow unloader or regulator valve 81, a relief valve 82, a pressure indicating gage 83, a pressure sensor 84 at the downstream side of the regulator, and a flow sensor 84a at the downstream side of the regulator. The following contingencies are monitored and handled, a) pump discharge pressure exists at 80, and discharge flow at 85 is blocked, as by turn-off of cleaning nozzle (see FIG. 8(a)), b) pump discharge pressure exists at 80, and discharge flow at 85 to cleaning nozzle is controlled with trigger operated valve 38. (See FIG. 8(b)), c) pump discharge pressure exists at 80, but there is open (i.e. unrestricted) flow at 85, due for example to inadvertent removal of nozzle unit 38 off hose 34. (See FIG. 8(c)), d) flow sensor 84a indicates no flow to nozzle, but pressure sensor 84 indicates high pressure. (See FIG. 8(d)).

Under condition a), the sensor 84 senses high pressure, and sensor 84a senses no flow, and their outputs operate via the computer to cause the regulator valve 81 to by-pass the flow via by-pass line 87 back to the pipe 88 connecting 51 to line a 57, seen in FIG. 5. The by-passed hi-pressure deionized water then flows back to join the deionized water stream from the two tanks 25 and 26. This allows pump 32 to continue to operate.

Under condition b) the outputs from the sensors 84 and 84a operate via the computer to cause the regulator valve to pass water to the cleaning nozzle unit 38. Excess pressure, should it occur, is relieved via the by-pass 87, as described. If pressure exceeds, say, 1,500 psi (a pre-set high emergency level) relief valve 82 opens to discharge water into the interior of the container 10, to drain out the bottom at 16.

Under condition c), flow sensor 84a senses very high flow, and pressure sensor 84 senses very low pressure, and these signals are recognized as indicative of a failed or missing hose, trigger operated valve, and/or nozzle, and processed by the computer which then shuts down the water supply (closes valves 50 and 51, and disconnects electrical power to the pump).

Under condition d), sensor 84a senses no flow, but sensor 84 senses high pressure. These signals are recognized by the computer as indicative of a failed regulator valve 81. The computer shuts down the system and calls home. See FIG. 14 for the call home office software operation sequence.

Referring now to FIGS. 9–14, they show, in function-labeled block form, the operational sequencing of the apparatus controls, as during various modes of operation. Various blocks also define means responsive to outputs of prior sequence blocks to perform functions, as stated.

Figure 10:
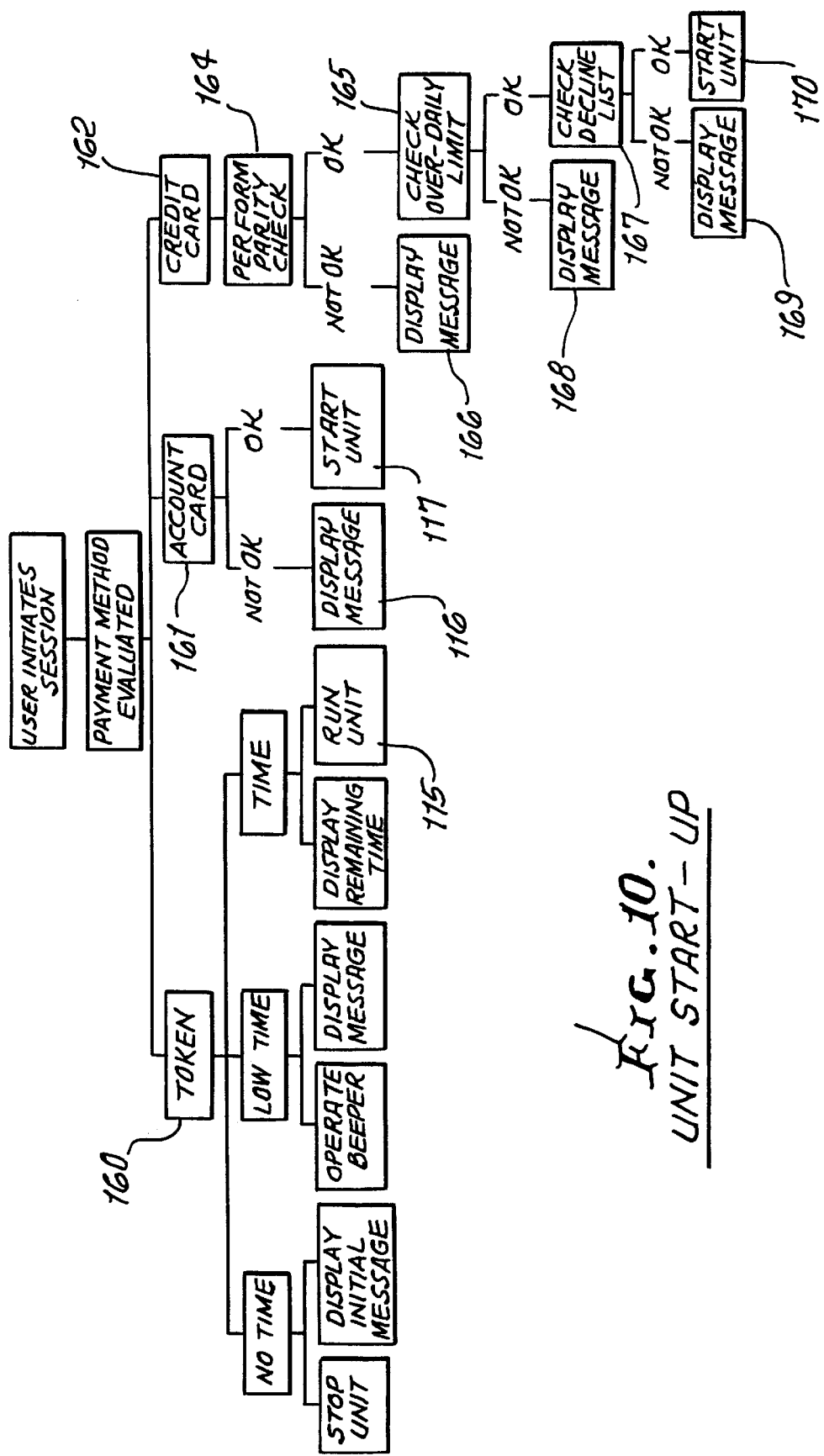

FIG. 1 also shows a credit card or token acceptor 110 on the front face 111 of the unit, as well as a start button 112 and card insert slot 113 for card (credit or account) reading. A status or instruction display is indicated at 114. FIG. 10 shows the steps and means for start up, including unit run and start indication at 115–117. In the event of attempted use of an invalid credit card, the programming allows unit start-up, but the home office is notified. Subsequent use of the invalid card does not permit start-up. See FIG. 10a.

FIG. 1 also shows a holder 120 for the nozzle 35, located at wall 12.

Summary and Operation

(Typical Example)

The wash system consists of 5 sub-systems. These include:

1. control and monitoring system
2. communication system
3. deionizing system
4. high pressure delivery system
5. back flow prevention system All sub-systems are contained within a vandal resistant steel housing. Advertising copy, operating instructions, warnings, credit card or token acceptor and hose outlet are located on the front face of the unit. Service access and deionizing bed-loading provisions are on the sides. Service connections consisting of potable water, electrical input and optional telephone are located at the rear of the unit.

When operated with a credit card or token, the apparatus operates by passing water through two deionizing beds and then to a high-pressure pump. Water is dispensed as for example through a 50-foot hose and a hand-held wand. Typical automobile cleaning time is about seventy-five seconds, with a water usage of about 2.5 gallons.

The control and monitoring system are contained within an electronics bay, a watertight steel box 125 within the outer housing. Basic control is through the use of a computer 126, typically equipped with additional circuit cards that enable the computer to interface with various sensors and controls.

A watchdog system requires the computer to check-in at one-minute intervals. If a check-in is missed, the watchdog circuit communicates with head quarters by hard-wired telephone or cellphone, and indicates the machine location and nature of the problem. Technicians can then re-boot or, attempt to restore normal computer functions. If these attempts fail, a service call is made to the unit where by the problem is remedied.

Monitoring devices within the unit consists of two total dissolved solids (TDS) sensors, one pH sensor, three pressure switches and one flow switch. Data from these sensors is fed to the computer and logged and periodically transmitted via the Internet to head quarters. Deionizing bed selection, as well as unit shutdown decisions, are made by the computer based on data received from these sensors.

Software installed in each unit typically consists of a Windows 98 operating system. Unit control functions and transactions in Visual Basic™ monitoring and remote control of each unit from head quarters is accomplished through PC ANYWHERE™.

Under normal operating conditions, all data is reported as a text file that is converted to a database. This database provides credit card transaction data to Visa supplied Point of Sale (P.O.S.) software, which then transmits credit card activity data to Visa for payment processing. The database also supplies information for routine service requests and provides monitored data in report form.

Various options, such as evening shutdown periods, sensor normalization periods, displayed messages, etc. are also accessible for each unit.

The communication system allows monitored data to be viewed by company personnel, it provides verification of proper computer operation, and it transmits all transaction data. The system includes two independent communication devices. Primary communication takes place through the computer and sends encrypted data via the Internet. The second communication system utilizes a pre-programmed telephone dialer and operates in a direct dial-up mode with headquarters and through a dedicated pager system. This system communicates if a computer system failure occurs. This system is also used to interrupt power to the computer to permit the computer to re-start if required. Communication method is installation dependent and is either by cellphone or hardwired telephone connection.

The deionization system normally consists of between two and six deionization beds, sensors, valves and other components necessary to allow water to flow through the selected bed or beds and to verify proper operation of those beds.

The described low-pressure manifold, sensors, valves, hose connections, etc. in addition to their primary duties, also permit bleeding air from the system, allow for relief of high-pressure that can occur with changes in ambient temperature when the unit is not in use. The deionizing beds also serve as a heat sink to allow re-circulation of water when the pressure pump is operating but the wand is not in use.

In operation, the deionized bed system will not significantly change the pH of the incoming or supply water but will reduce total dissolved solids (T.D.S.) to a value less than 10 parts per million.

The high-pressure delivery system includes the motor pump for increasing water pressure to 1200 psi, the high-pressure manifold, the hose reel, the hose, and the trigger operated wand.

The high-pressure manifold, contains an un-loader valve set at 1200 psi, a pressure-switch, flow-switch, pressure gage, and a high-pressure relief valve set at 1500 psi. These devices allow the computer to monitor pump conditions, hose conditions and also allow the computer to assign either run-rate charges or idle rate charges against the operators credit card.

The back-flow prevention system, is as required by all local water districts. In the event of a reduction in municipal water pressure, this system will prevent the flow of water from the deionizing beds or plumbing within the unit from entering the municipal water system.

FIGS. 9–14 are block diagram labeled for showing operation sequencing and functioning, as controlled by associated software means, or elements.

Figure 9:
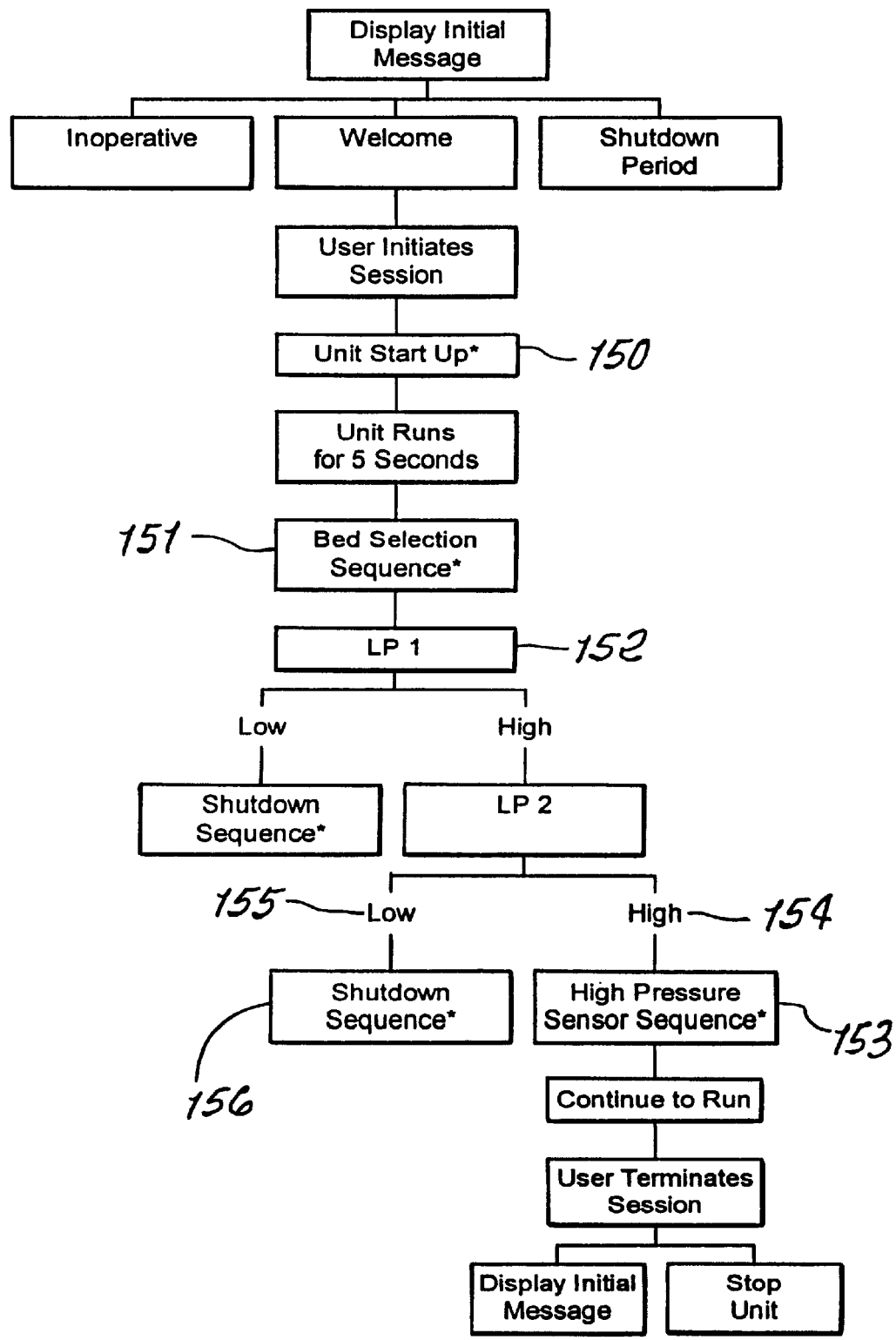

With reference to FIG. 9, and from what has been described, computer apparatus 100, as referred to, is associated with the vehicle wash station. The system includes:

a) a wash station including water flow deionizing and delivery elements, and having at least two deionizing treatment beds, b) computer apparatus associated with the station, and including circuitry, c) the circuitry having first means for sensing an operating input by a user at the station, and to produce an output, including start-up (see 150), d) the circuitry also having
  i) second means responsive to said output to initiate operation of water flow to the deionizing and delivery elements,
  ii) third means responsive to composition of the flow to control water flow through one or more of the beds, (see bed-selection sequence 151), e) and there being fourth means responsive to pressure of the flow to effect a change in the flow when the flow pressure changes relative to a predetermined limit or limits.

The said fourth means typically includes at least one of the following:

$x_1$) a low pressure sensor (see block 152)
$x_2$) a high pressure sensor (see block 153)
$x_3$) both low pressure and high pressure sensors.

Also, and with regards to FIGS. 9, 11 and 13, the fourth means typically includes a means to shut-down said flow in response to one of the following:

$y_1$) sensed flow pressure above a predetermined limit (see 154)
$y_2$) sensed flow pressure below a predetermined limit (see 155)

The circuitry also includes fifth means responsive to manual operation to shut-down operation of the system. (See block 156)

With reference to FIGS. 1 and 10, the first means typically includes one or more of the following to response to said operating input:

iii) a token payment sensor (see 160)
iv) an account card reader (see 161)
v) a credit card reader (see 162)

Note also in FIG. 10 the provision for parity check at 164, boxes and functions at 165–170, including start-up. See also FIG. 10a, and functions.

Figure 12:
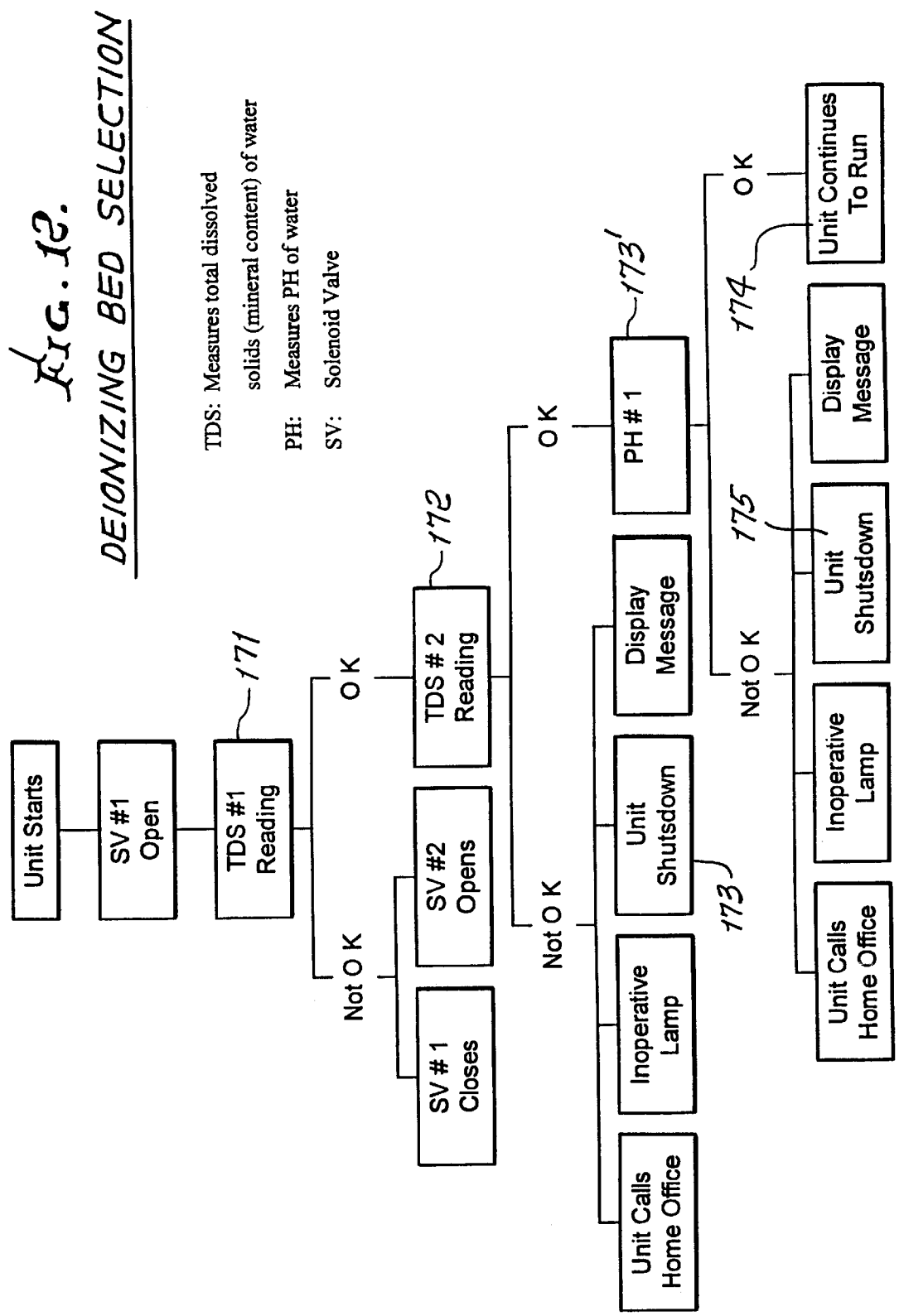

With reference to FIGS. 5 and 12, the third mentioned means, which is responsive to the flow composition, typically includes:

iii) a first TDS sensor located to sense total dissolved solids in the flow from a first one of the beds, and to produce a control output, (see block 171),
iv) means responsive to said control output of the first TDS sensor to enable water flow input to a second of the beds when said sensor total disclosed solids in the flow from the first bed exceeds a predetermined threshold,
v) a second TDS sensor located to sense total dissolved solids in the flow from the second bed, and to produce an output, (see block 172),
vi) means responsive to said output produced by the second TDS sensor to effect shut-down of water flow in the system when the total dissolved solids in water flow from the second bed exceeds a predetermined threshold. (See block 173).

Also, water pH is sensed, as indicated by block 173', and if, acceptable the unit continues to run. See block 174. If not acceptable, shut-down occurs. See block 175, and auxiliary functions.

With reference to FIGS. 1, 11, 12 and 13, the computer circuitry typically includes auxiliary means for $z_1$) shutting-down system operation $z_2$) and communicating the operating or shut-down status of the system to a remote control location.

The remote control location may be a home office or headquarter having operative communication with the referenced auxiliary means, at the wash station, whereby efficient business communication is established, and also with respect to FIG. 14 sequencing.

With regard to FIG. 14, the computer circuitry may also include auxiliary dialing circuitry, see 176, characterized by $z_3$) an automatic dialing mode, (see block 178) operable to communicate station computer disabled status, to said remote location $z_4$) a user operated dialing mode, operable to communicate a coded message to said remote location. (See-block 178).

A modem may be provided (see block 179) to transmit at least one of the following:

$z_5$) a call from said remote location to said station (see block 180)

$z_6$) a dialed call in one of said dialing modes $z_7$) a message from said station, indicating station location, and nature of a problem with operation of the system.

We claim:

1. A system to produce a high pressure stream deionized water, for cleaning vehicle bodies, comprising, in combination:
   a) first and second deionization beds within first and second vessels,
   b) a first conduit or conduits to conduct non-deionized water at a relatively low pressure or pressures to pass through the first bed to deionize the water,
   c) a primary sensor to measure the deionization level of water that has passed through the first bed,
   d) a second conduit or conduits to conduct water from the first bed to the second bed to further deionize the water, if required,
   e) a pump to receive water that has passed through the second bed, or through the first and second beds, and to pressurize said received water to a level of at least about 1,200 PSI,
   f) and a nozzle connected to the pump and operable to controllably dispense a high pressure stream of deionized water for highly effective cleaning of said bodies,
   g) and said primary sensor including means for sensing the level of dissolved solids in the water flow from one of the beds, and to conduct water flow to the other of said beds in response to said sensed level exceeding a predetermined threshold.

2. The combination of claim 1 including a by-pass conduit to return water from the pump to one of said vessels when flow of water from the nozzle is interrupted, whereby the apparatus then operates at an idle level.

3. The combination of claim 1 including valving controlled by the primary sensor to alter flow of water via the second conduit or conduits to the second bed, in response to detection by the primary sensor of an ionization level that is unacceptably high.

4. The combination of claim 1 including a secondary sensor to measure the ionization level of water that has passed through the second bed.

5. The combination of claim 1 including a data card reader, and control means responsive to operation of said reader to control flow of water in said system.

6. The combination of claim 5 including at least one chamber in which said vessels, conduits and pump are carried, the nozzle located for access from the outside of said at least one chamber, said reader carried by said at least one chamber to read information on a data card presented at a reading zone accessible at the exterior of said at least one chamber.

7. The combination of claim 6 including said data card presented at said reading zone.

8. The combination of claim 7 wherein said control means including circuitry responsive to reading of both valid and invalid credit cards to effect said flow of water in the system.

9. The combination of claim 7 wherein said data card is a credit card.

10. The combination of claim 5 wherein said control means includes circuitry responsive to reading of both valid and invalid data cards to effect said flow of water to the beds.

11. The combination of claim 1 including first means responsive to determination of a non-neutral pH level of water than has passed through at least one of the beds to effect one of the following:
    i) shut down of water flow through the beds and pump
    ii) energize a display message
    iii) energize a display lamp
    iv) transmit a message to a control center.

12. The combination of claim 1 including lower pressure manifold structure including first and second manifold sections, valving blocking communication between said section, the first section communicating with an inlet or inlets to at least one of said vessels, and the second section communicating with an outlet or outlets from at least one of said vessels, whereby water flows from said manifold first section to said manifold second section via a bed or beds in at least one of the vessels.

13. The combination of claim 12 including computer controlled solenoid valves connected between said manifold first section and the inlets to said vessels.

14. A system to produce a high pressure stream of deionized water, for cleaning vehicle bodies, comprising, in combination:
    a) first and second deionization beds within first and second vessels,
    b) a first conduit or conduits, to conduct non-deionized water at a relatively low pressure or pressures to pass through the first bed to deionize the water,
    c) a primary sensor to measure the deionization level of water that has passed through the first bed,
    d) a second conduit or conduits to conduct water from the first bed to the second bed to further deionize the water, if required,
    e) a pump to receive water that has passed through the second bed, or through the first and second beds, and pressurize said received water to a level of at least about 1,200 PSI,
    f) a nozzle connected to the pump and operable to controllably dispense a high pressure stream of deionized water for highly effective cleaning of said bodies,
    g) and including an assembly operatively connected between the pump and nozzle and including
       i) a regulator valve
       ii) a first sensor being a pressure sensor at the down stream side of the regulator valve,
       iii) and a second sensor being a flow sensor at the down stream side of the regulator valve
       iv) and a by-pass conduit or conduits connected between the regulator valve and the intake side of one of said vessels, and v) control means responsive to said sensor whereby in the event of no-flow as sensed by said second sensor, and a high pressure as sensed by said first sensor, the control means operates to open the regulator valve to by-pass the flow to the intake side of said one vessel, and whereby in the event of high flow as sensed by said second sensor and very low pressure as sensed by said first sensor, the control means operates to shut-down the system, and whereby, in the event of predetermined acceptable flow as sensed by the second sensor, and predetermined acceptable high flow pressure, the control means will allow the regulator valve to continue to pass the flow from the pump to the nozzle.

15. The combination of claim 14 wherein said regulator valve and said first and second sensors are incorporated in a high pressure manifold located in a lower region of a chamber containing said vessels.

16. The combination of claim 15 including a hose connected in series with the nozzle, and a hose reel in the chamber for reeling said hose.

17. The combination of claim 16 including a nozzle receptacle carried by said chamber to be accessible at the exterior of the chamber.

18. The combination of claim 14 including a low pressure manifold structure including first and second manifold sections, valving blocking communication between said section, the first section communicating with an inlet or inlets to at least one of said vessels, and the second section communicating with an outlet or outlets from at least one of said vessels, whereby water flows from said manifold first section to said manifold second section via a bed or beds in at least one of the vessels.

19. The combination of claim 18 including ducting communicating between said low pressure manifold second section and the inlet to said pump.

20. A deionized water wash system, as for washing vehicles, that includes:
   a) a wash station including water flow deionized and delivery elements, and having at least two deionizing treatment beds,
   b) computer apparatus associated with said station, and including circuitry,
   c) said circuitry having means for sensing an operating input by a user at said station, and to produce an output,
   d) the circuitry also having
      i) second means responsive to said output to initiate operation of water flow to said deionizing and delivery elements,
      ii) third means responsive to composition of said flow to control water through one or more of said beds,
   e) and there being fourth means responsive to pressure of said flow to effect a change in said flow when said flow pressure changes relative to a predetermined limit or limits,
   f) and whereby said third means includes:
      iii) a first TDS sensor located to sense total dissolved solids in the flow from a first one of the beds, and to produce a control output,
      iv) means responsive to said control output, of the first TDS sensor to enable water flow input to a second of the beds when said sensed total dissolved solids in the flow from the first bed exceeds a predetermined threshold.

21. The system of claim 20 wherein said fourth means includes at least one of the following:
   $x_1$) a low pressure sensor
   $x_2$) a high pressure sensor
   $X_3$) both low pressure and high pressure sensors.

22. The system of claim 20 wherein said fourth means includes a means to shut-down said flow in response to one of the following:
   $y_1$) sensed flow pressure above a predetermined limit
   $y_2$) sensed flow pressure below a predetermined limit.

23. The system of claim 20 wherein said circuitry include fifth means responsive to manual operation to shut-down operation of the system.

24. The system of claim 20, wherein said first means includes one or more of the following to respond to said operating input:
   iii) a token payment sensor
   iv) an account card reader
   v) a credit card reader.

25. The system of claim 20 wherein said third means includes:
   iii) a first TDS sensor located to sense total dissolved solids in the flow from a first one of the beds, and to produce a control output,
   iv) means responsive to said control output of the first TDS sensor to enable water flow input to a second of the beds when said sensor total dissolved solids in the flow from the first bed exceeds a predetermined threshold.

26. The system of claim 25 which includes:
   v) a second TDS sensor located to sense total dissolved solids in the flow from the second bed, and to produce an output
   vi) means responsive to said output produced by the second TDS sensor to effect shut-down of water flow in the system when the total dissolved solids in water flow from the second bed exceeds a predetermined threshold.

27. The system of claim 25 wherein the circuitry includes auxiliary means for:
   $z_1$) shutting-down system operation
   $z_2$) and communicating the operation or shut-down status of the system to a remote control location.

28. The system of claim 27 wherein including said remote control location which is a home office having operative communication with said auxiliary means, at said station.

29. The system of claim 27 wherein said circuitry includes auxiliary dialing circuitry characterized by
   $z_3$) an automatic dialing mode, operable to communicate station computer disabled status, to said remote location
   $z_4$) a user operated dialing mode, operable to communicate a coded message to said remote location.

30. The system of claim 29 wherein said circuitry includes a modem to transmit, at least one of the following:
   $z_5$) a call from said remote location to said station
   $z_6$) a dialed call in one of said dialing modes
   $z_7$) a message from said station, indicating station location, and nature of a problem with operation of the system.

* * * * *